United States Patent [19]

Costa, Jr. et al.

[11] Patent Number: 4,937,974
[45] Date of Patent: Jul. 3, 1990

[54] SUPPORT ASSEMBLY FOR POSITIONING OF A PLANTING POT WITHIN AN OUTER LIQUID CONTAINING POT

[76] Inventors: Jose A. Costa, Jr., 22290 SW. 162nd Ave., Gould, Fla. 33170; Julian Gutierrez, 6205 SW. 116th St., Miami, Fla. 33156

[21] Appl. No.: 332,512

[22] Filed: Apr. 3, 1989

Related U.S. Application Data

[63] Continuation-in-part of Ser. No. 243,500, Sep. 12, 1988.

[51] Int. Cl.⁵ ............................................. A01G 25/00
[52] U.S. Cl. ................................... 47/81; 47/72; 47/82
[58] Field of Search .................. 47/79, 80, 81, 82, 83

[56] References Cited

U.S. PATENT DOCUMENTS

| | | | |
|---|---|---|---|
| 2,492,152 | 12/1949 | Hollowell | 47/80 |
| 3,739,524 | 6/1973 | Rose | 47/81 |
| 3,898,766 | 8/1975 | Goldstaub | 47/81 |
| 3,906,667 | 9/1975 | Williams | 47/79 |
| 4,014,506 | 3/1977 | Hanson | 47/79 X |
| 4,236,351 | 12/1980 | Smith | 47/79 |
| 4,344,251 | 8/1982 | Edling | 47/80 |
| 4,829,709 | 5/1989 | Centafanti | 47/79 |

FOREIGN PATENT DOCUMENTS 1058528  2/1967  United Kingdom ............... 47/39

Primary Examiner—Robert A. Hafer
Assistant Examiner—Lynda M. Cofsky
Attorney, Agent, or Firm—Malloy & Malloy

[57] ABSTRACT

A support assembly for a conventionally structured planting pot designed to position and support the planting pot on the interior of an outer liquid containing container wherein the support assembly includes an adjustable support structure for maintaining any one of a variety of planting pots above an existing level of water or irrigating liquid within the container and a positioning structure both fixedly and adjustably disposed to properly position the supported plant pot in a centered location within the outer container.

11 Claims, 2 Drawing Sheets

SUPPORT ASSEMBLY FOR POSITIONING OF A PLANTING POT WITHIN AN OUTER LIQUID CONTAINING POT

BACKGROUND OF THE INVENTION

This is a continuation-in-part application of a presently copending application Ser. No. 243,500 filed Sept. 12, 1988.

1. Field of the Invention

The present invention is directed towards a support assembly for positioning and supporting a conventional planting pot within any one of a plurality of outer liquid containing containers of varying sizes such that the planting pot is maintained above an existing level of liquid within the outer container and disposed in a preferred position spaced from the interior of the outer container.

2. Description of the Prior Art

In the growing and maintenance of small plants within conventionally structured planting pots there is a need to provide water or applicable liquid to the root system of the plant on a substantially continuous basis and in correct amounts. In order to avoid the disadvantages associated with manual watering, various "automatic" watering systems are known in the prior art. One such method of accomplishing proper watering of a plant within a conventional plant pot is through the use of a structure which facilitates transfer of liquid from a liquid reservoir or supply to the plant by means of capillary action. Typically, a conventional planting pot includes a floor having a centrally located aperture which serves as a drain hole. A surrounding side wall normally includes vents adjacent the floor and spaced from the drain hole. For purposes of aesthetics, it is typical for such a planting pot to be placed on the interior of a larger, outer container or pot which may be more decorative and also which may be structured to contain a liquid reservoir or supply of water or irrigating liquid therein.

Generally speaking, it would be harmful to place the planting pot within an outer container or pot such that the lower portion of the planting pot is submerged within the supply of water or irrigating liquid maintained within the outer container. The result would be an over watering which would frequently result in root rot. To the contrary, it is desirable, to maintain the pot out of direct contact with the supply of liquid therein but otherwise position the planting pot and the root system contained therein to be in "fluid communication" with a supply of water. Therefore, proper watering, as needed is accomplished. As set forth above, a wick structure formed from a material which facilitates capillary action could be utilized to establish a path of fluid flow between the liquid supply and the interior of the planting pot to the root system contained therein.

It is also quite common for the outer containers to vary in size, shape, configuration, etc. depending upon a preferred aesthetic appearance of the outer container. Regardless of the differences in shape or dimension of the outer container, it is highly desirable to position and support a planting pot on the interior of the outer container in a preferred location, out of contact with the liquid reservoir regardless of the size of the outer container.

This may best be accomplished by a preferred support assembly for a planting pot which includes certain structural features allowing the maintenance and support of the planting pot out of direct contact with the irrigating liquid within in the interior of the outer container. Also, such a preferred support assembly should include a positioning structure which enables a preferred or "centered" position of the planting pot and the remainder of the support assembly away from the interior sides of the outer container so that the overall appearance of the plant issuing through the open mouth of the outer container has a more symmetrical and also aesthetically pleasing visual effect. Also, when it is desired to replace the outer container or pot, one may merely remove the planting pot from the support assembly and thereafter remove the support assembly from the interior of the container for positioning of the entire support assembly and planting pot in a new container as desired.

In addition to the structural features set forth above, a preferred support assembly should be of relatively simple construction, inexpensive and yet readily adaptable to facilitate its use with planting pots of various sizes and configurations as well as allowing the assembled support assembly and planting pot to be readily adaptable for positioning on the interior of a variety of outer containers varying in configuration and dimension as desired.

SUMMARY OF THE INVENTION

The present invention relates to a support assembly specifically designed to position and support a conventional planting pot on the interior of an outer container or pot having a supply or reservoir of water or like irrigating liquid maintained within the outer pot. More specifically, the subject support assembly, in one preferred embodiment, is designed to be used in combination with a water delivery means or watering structure operating by means of capillary action. The water delivery means, to be described in greater detail hereinafter, delivers water from a water reservoir within the outer container to the root system on the interior of the conventional planting pot through a drain hole disposed in the base of the planting pot.

Accordingly, the subject support assembly is specifically structured to include a support means including a support platform which is raised above a supporting base of the support assembly and above the floor of the outer container and also above the level of water or like irrigating liquid maintained within the outer container. Therefore, the path of fluid flow from the liquid reservoir to the root system of the plant within the plant pot is accomplished by capillary action through a wick-like member which may vary in structure depending upon the particular embodiment of the present invention utilized.

More specifically, the support assembly of the present invention comprises a base designed to be supported on the interior surface of the floor of the outer container. A support means includes a plurality of spaced apart support stanchions each removably secured within a receiving socket and extending upwardly from the base by virtue of this connection. The receiving sockets themselves are fixedly or integrally secured to the base and are dimensioned to removably receive a lower most end of the support stanchions therein.

A support platform is formed on the support stanchions and is more specifically defined by a plurality of support members each fixedly or integrally secured to a different one of the stanchions and extending radially inward therefrom at a common height. By virtue of this structure and disposition, the under portion or surface of the base of a conventional planting pot is removably positionable and supported on these plurality of support members in a position which is spaced above the floor of the outer container and also above the level of liquid reservoir maintained in the outer container. The planting pot therefore is maintained out of contact with the liquid reservoir so as to prevent excess watering thereof.

However, fluid communication is established between the liquid reservoir and the root system or interior of the planting pot by virtue of a liquid delivery means. This liquid delivery means, depending upon the embodiments of the present invention utilized, is defined by a wick structure formed of a variety of materials all of which facilitates the passage of liquid along the length of the wick by means of capillary action. The material from which such wick structure is formed may include but is not limited to cellulose, cotton, polyester, rayon, sponge, etc. Also, the specific structure, disposition, configuration and mounting or attachment of the wick structure to the base and its engagement in fluid delivering relation to the interior of the planting pot, preferably through a drain hole in the base thereof, may vary again depending upon the particular embodiment of the subject invention utilized.

The support assembly of the present invention further comprises a positioning means formed on the stanchions. Such positioning means in one embodiment may take the form of a plurality of fixed positioning elements each fixedly or integrally attached to a different one of the stanchions and disposed to extend outwardly therefrom into engaging relation with the interior wall surface of the outer container. Alternately, a different embodiment of the positioning means includes each of the stanchions having a movable positioning member movably mounted thereon so as to be selectively positioned outwardly therefrom into engagement with the interior wall surface of the outer container. This allows the same support assembly to position a given planting pot on the interior of any one of a variety of outer containers. The configuration and/or size of a plurality of the outer containers may vary as long as each is greater in diameter than that of the planting pot. Preferably, each of the movable positioning members may be pivoted outwardly from its respective stanchion through an arc of from zero degrees (co-linear alignment with the stanchion) to approximately ninety degrees (perpendicular relation to the respective stanchion).

The present invention accordingly comprises the features of construction, a combination of elements, an arrangement of parts which will be exemplified in the construction hereinafter set forth, and the scope of the invention will be indicated in the claims.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
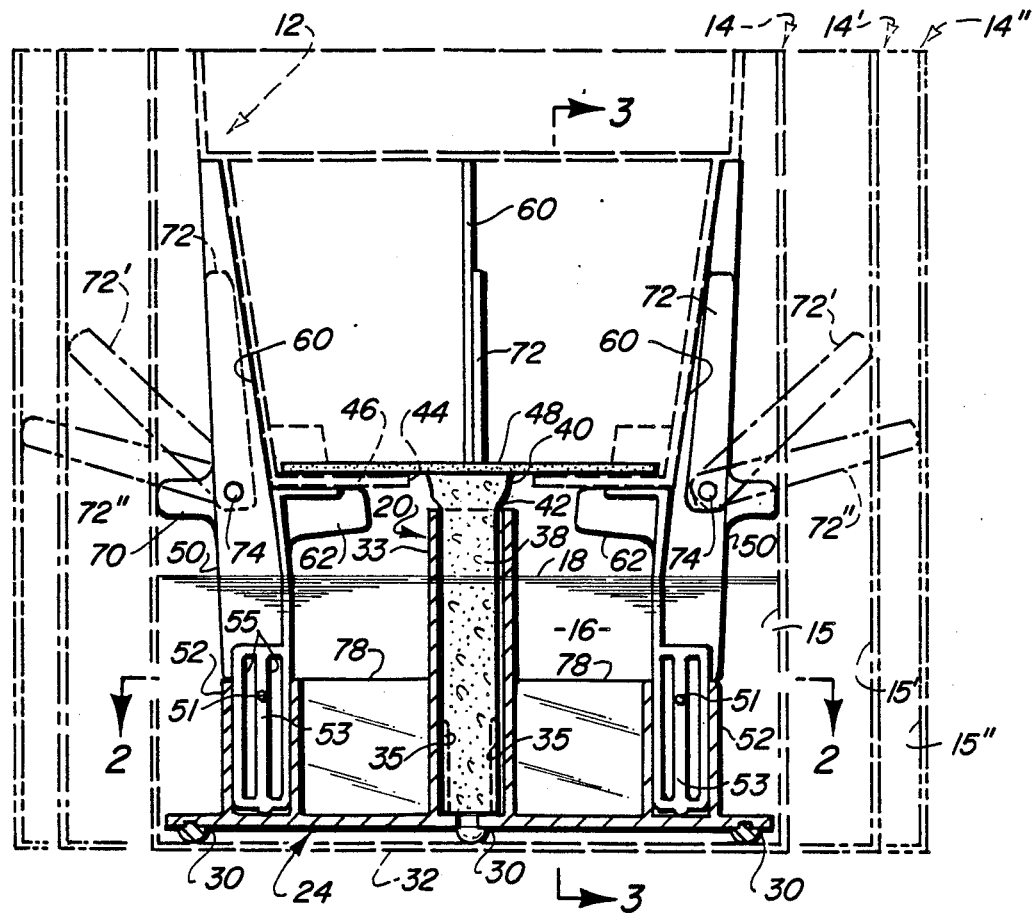
FIG. 1 is a sectional view in partial phantom of the support assembly of the present invention mounted within an outer container wherein the outer container may be any one of a variety of larger sizes.
Figure 2:
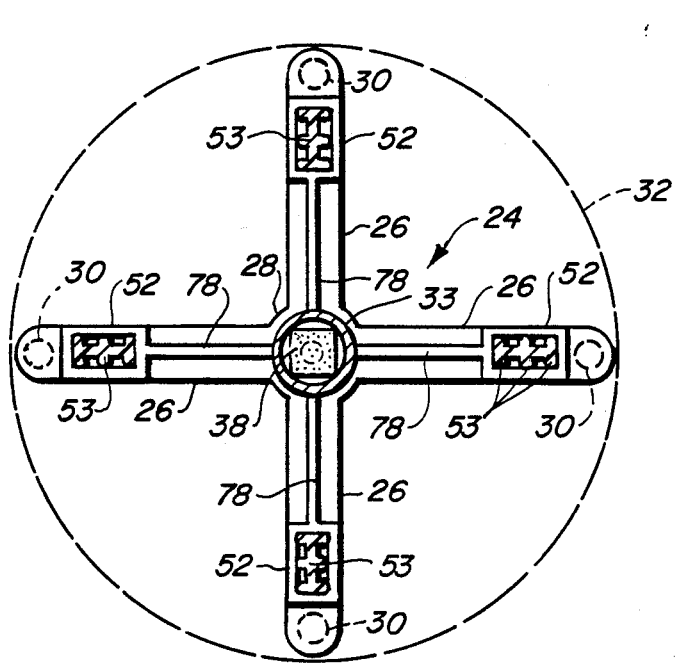
FIG. 2 is a sectional view along line 2—2 of FIG. 1.

The present invention relates to a support assembly of the type designed to support and properly position a substantially conventional planting pot generally indicated as 12 on the interior of an outer container generally indicated as 14. As shown in phantom lines in FIG. 1, the size and/or configuration of the outer pot 14 as at 14' and 14" may vary as long as the size or more specifically the diameter is greater than the planting pot 12. The outer pot 14 is specifically designed to effectively cover or enclose the planting pot 12 and also maintain a reservoir or supply of liquid 16 having an upper surface level 18 on the interior thereof. The supply of water or other irrigating liquid 16 and its delivery from the interior of the outer container 14 to the interior of the planting pot 12 will be described in greater detail with regard to a fluid delivery means generally indicated as 20 and 22 in the different embodiments of FIGS. 1 and 5.

The support assembly of the present invention comprises a base 24 preferably in the form of a plurality of outwardly extending, spaced apart spokes 26 extending radially outward from a central hub 28. The under surface of the base 24 may include engaging members 30 such that both the engaging members 30 and the base itself 24 are effectively supported on the floor 32 of the outer container 14. Naturally, the irrigating liquid reservoir 16 also rises from the floor 32 and is contained in the lower portion of the outer container 14 by the interior surfaces of the side walls as at 15. The provision of the contacting members 30 is to adapt the base 24 to any incongruenties or inconsistencies in the interior surface of the floor 32 thereby insuring the base 24 has a stable support surface on which to rest.

The fluid delivery means 20 of the embodiment of FIG. 1 comprises a centrally disposed elongated hollow sleeve 33 having at least one aperture on the lower most end thereof as at 35. These apertures allow liquid communication between the interior of the sleeve and the liquid reservoir 16. An elongated wick structure 38 is disposed within the sleeve 33 such that its lowermost end is effectively submerged on the interior of the sleeve 33 due to the fact that the interior of the sleeve has the liquid passing therein through the provision of the apertures 35. The opposite or uppermost end of the wick 38 as at 40 passes through an open upper end 42 of the sleeve 33 such that the end 40 passes into the interior of the planting pot 12 through a conventionally disposed and structured drain opening 44 formed in the base 46 of the planting pot 12. A dispersing pad 48 is in contact with the upper end 40 of the wick 38 and is also formed from a material which facilitates the flow of liquid therethrough due to capillary action. The pad 48 is maintained in direct contact with the growing soil and/or root system within the interior of the planting pot 40 so as to readily disperse liquid therethrough, as it is drawn up through the wick 38 due to capillary action. It should be noted that the weight of the growing soil, root system and the plant disposed within the planting pot exerts a force against the support shaft 100 and biasing spring 101. The contents of the planting pot is not shown herein for purposes of clarity.

Figures 3, 4:
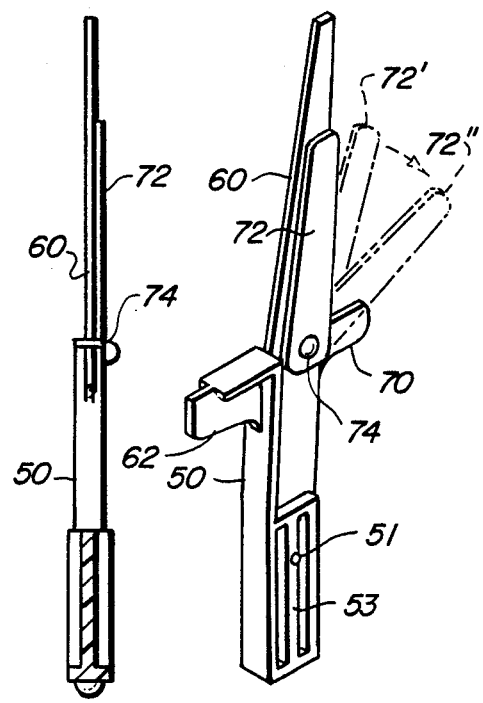
FIG. 3 is a longitudinal sectional view along line 3—3 of FIG. 1.
FIG. 4 is a longitudinal sectional view along line 4—4 of FIG. 1.

The support assembly of the present invention further comprises a plurality of support members each defined by an upstanding, elongated support stanchion 50. The lower most end of each support stanchion is removably secured to the base 24 due to the provision of a plurality of receiving sockets 52 being interiorly dimensioned and configured to frictionally engage the lower most end of the stanchion 50 as at 53. The ends 53 of each stanchion have a plurality of spaced apart reinforcing ribs integrally formed therein as at 55 to provide structural integrity to at least a portion of each stanchion engaged and supported by the receiving sockets 52. Further, as shown in FIG. 4, a locking means is provided in the form of a protruding member 51 secured to and extending outwardly from at least one but preferably both sides of the ribs 53 of each stanchion 50 and into engagement with an interior surface portion or peripheral lip of the interior surface or opening respectively of the respective receiving socket 52 in which the particular stanchion 50 is mounted. This prevents inadvertent removal of the stanchion from a given receiving socket but allows its intentional removal with the exertion of proper pulling force thereon.

Figures 5, 6, 7:
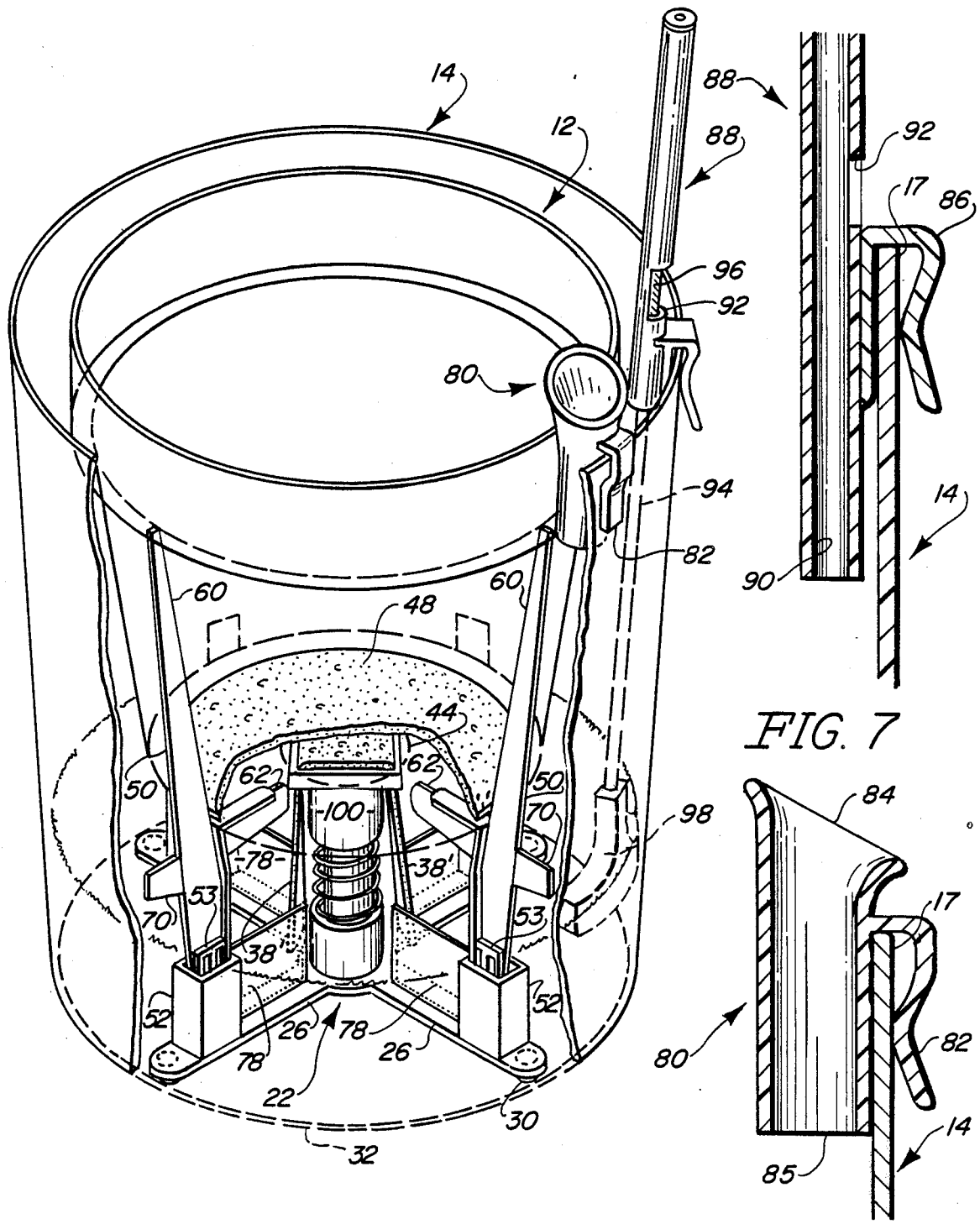
FIG. 5 is a perspective view in partial cut-away and phantom of the support assembly of the present invention incorporating a different embodiment of a fluid delivery structure used to supply irrigating liquid from the interior of an outer container to the interior of a conventional planting pot.
FIG. 6 is a sectional view in partial cut-away of an assembly which may be utilized to supply liquid to the liquid reservoir on the interior of the outer container.
FIG. 7 is a sectional view in partial cut-away of details of an indicating structure associated with the present invention.

One feature of each stanchion is an interior, generally peripheral surface 60 being substantially configured in congruent relationship to the exterior surface of the planting pot as best shown in FIGS. 1 and 5 in order to provide a stable support and positioning facility for the planting pot 12. This is accomplished also by the fact that the plurality of the stanchions, and particularly the upper peripheral surfaces thereof collectively surround the outer surface of the side wall of the planting pot 12 in the manner clearly shown.

A support platform is provided to maintain and support the planting pot 12 in a location on the interior of the outer container 14 above the floor 32 thereof and specifically, above and in spaced relation to the upper level 18 of the liquid reservoir 16. This ensures that the interior of the planting pot 12 is maintained out of direct contact with the irrigating liquid 16 in order to prevent over watering. The support platform includes a plurality of support members (see FIGS. 1, 4, 5 and 62) fixedly or integrally secured to each of the stanchions 50 and preferably extending radially inward towards the sleeve 33 or the center of the base 24. Further, when the stanchions 50 are properly seated and supported within the receiving sockets 52 all of the support members 62 are disposed at a common height in order to supportingly engage an under portion of the planting pot 12 or more specifically an outer, under surface of the base 46 of the planting pot 12.

The subject support assembly further includes a positioning means. The positioning means, in one embodiment of the present invention includes a plurality of fixed positioning members 70 fixedly or integrally secured to an outer portion of each stanchion 50 and extending outwardly therefrom so as to engage correspondingly positioned portions of the interior surface 15 of the outer container 14. This serves to effectively "center" the support assembly and the supported planting pot 12 on the interior of the container 14 and in a generally spaced relation to the interior surface 15 thereof.

Another embodiment of the positioning means includes a plurality of movable positioning members 72 pivotally or otherwise movably secured to a different one of the plurality of stanchions 50 as by a connector or like member 74 secured in interconnecting relation preferably between one end of each movable positioning member 72. This type of connection allows selective pivotal placement of any of the movable positioning members 72 from a straight, linearly aligned relation to the respective stanchion 50 to which it is attached outwardly through an arc of approximately ninety degrees or less into engagement with the interior surface 15' or 15" of the outer containers 14' or 14" respectively. Obviously, it should be apparent that the outer pivotal positioning of the movable positioning members 72 depends upon the diameter of the respective outer container 14, 14' or 14" utilized. Selectively, each of the positioning members 72 can be moved outwardly from its linearly aligned position with its respective stanchion, to a point of engagement with the interior surface 15 (or 15', 15") depending on the size or more specifically, the diameter of the outer container 14, 14' or 14".

Other structural features associated with either the embodiments of FIGS. 1 and 5 of the subject support assembly include brace members in the form of fixed or integrally formed flanges or plates 78 interconnecting respectively position sockets 52 and outer surface portions of the central sleeve 33.

Yet other features of the present invention are clearly shown in FIG. 5 and include a removably mounted spout 80 having a connecting clip 82. The spout 80 has an enlarged outwardly expanding mouth 84 to receive water therein so that such water or like irrigating liquid will pass into the interior of the outer container 14 in the spacing between the interior surface of the planting pot 12 and the interior surface 15 of the outer container 14. Liquid is thereby supplied to the reservoir 16. The clip 82, as best shown in FIG. 6, serves to removably secure the spout 80 adjacent to the upper periphery as at 17 to the side wall of the outer container 14 as shown. The opposite open end as at 85 of the spout directs water into the interior of the outer container as set forth above.

With regard to FIG. 7, a similar clip 86 is used to removably secure a retaining sleeve indicated as 88 to the outer periphery 17 of the side wall of the outer container 14 as shown. The sleeve 88 may be considered a part of the indicator means and has a hollow interior portion 90 and an open window 92 communicating with the hollow interior 90 along a portion of its length. The provision of window 92 allows viewing of a color coded, elongated stem 94 as at 96 so as to indicate the amount of liquid defining the liquid reservoir 16 and more specifically the upper level 18 of the reservoir 16. The portion 96 of the stem 94 may be color coded to the extent that the color green (or any other designated color) may show through window 92 when adequate water is provided on the interior bottom of the outer container 14. Conversely the color red may show through the window 92 as the stem 94 lowers due to its connection with the float structure 98 on a lowermost end thereof. The float structure of course raises and lowers with the level of the liquid reservoir 16. The stem 94 being attached to the float 98 also raises and lowers within the interior 90 of the sleeve 88. Therefore, the color coding of the portion 96 appears through window 92. When the quantity of liquid within reservoir 16 is low, a colored red portion will appear through the window 92. When the amount of liquid poured in reservoir 16 is adequate, the green color as at 96 will appear through the window 92 indicating that no additional watering is necessary through the expanded open spout 80.

Another embodiment of the present invention is shown in FIG. 5 wherein a wick 38' is provided in strip form and is secured by a support shaft 100 biased by spring 101 serving to support a mid portion of the wick into liquid transferring engagement with the pad 48 through the aforementioned drain hole 44 as opposite ends of the wick 38' are in contact with the liquid reservoir 16 preferably below or floating on the liquid surface 18.

It should therefore be apparent that the structure of the present invention and in particular the configuration and disposition of the plurality of stanchions in supporting engagement with the planting pot allows for instant removal or separation of the planting pot from its supported position on the support platform defined by the support stanchions. This removal or separation of the planting pot can be accomplished without any physical detachment or dismantling of the support means, stanchions, or the outer liquid containing container.

Now that the invention has been described,

What is claimed is:

1. A support assembly designed to support a planting pot within an outer container in fluid communication with liquid contained within the outer container, said support assembly comprising:
   a. a base disposed in supported engagement on an inner floor of an outer container in at least partially submerged relation to liquid therein,
   b. support means for the support of the planting pot comprising a support platform adapted to supportingly engage an under portion of the planting pot and including a plurality of spaced apart stanchions extending upwardly from said base and adapted to supportingly engage the exterior surface portions of the planting pot,
   c. said support platform defined by a plurality of spaced apart support members each secured to a different one of said stanchions at a common height above said base sufficient to maintain a planting pot above the level of liquid within an outer container, said support members extending radially inward therefrom and adapted to supportingly engage a planting pot,
   d. positioning means mounted on said support means and extending laterally outward therefrom for engaging the interior wall surface portions of the outer container for disposing the planting pot in a preferred location within the outer container,
   e. said positioning means comprising a movable positioning member movably mounted on each of said stanchions and selectively disposable from an aligned, substantially parallel relation to said one stanchion outwardly in a substantially vertical plane at substantially varying distances from said one stanchion for engagement with an interior wall surface of the outer container, whereby the planting pot may be positioned within any one of a plurality of outer containers of varying, greater diameters than the planting pot, and
   f. liquid delivery means mounted on said base in at least partially submerged position within the liquid and extending upwardly therefrom for delivering liquid to the interior of the planting pot.

2. An assembly as in claim 1 wherein said support platform is secured to said plurality of stanchions and extends inwardly therefrom for supporting an under surface portion of a planting pot.

3. An assembly as in claim 1 wherein a length of each of said stanchions extending above a respective one of said support members is disposed collectively with the remainder of said stanchions in surrounding, containing relation to an exterior of a planting pot.

4. An assembly as in claim 3 wherein each of said stanchions is dimensioned and configured to engage and retain the exterior of the planting pot along the respective lengths thereof extending above said respective support members.

5. An assembly as in claim 4 wherein each of said stanchions comprises an inner peripheral surface extending above respective ones of said support members and being configured to engage an outer wall surface of the planting pot along a majority of the length of said inner peripheral surfaces.

6. An assembly as in claim 1 wherein said positioning means further comprises a fixed positioning member secured to each of said stanchions and extending outwardly therefrom for engaging a correspondingly positioned interior wall surface of the outer container.

7. An assembly as in claim 1 wherein each of said movable positioning members is pivotally connected at one end thereof and selectively positionable outwardly relative to a respective stanchion through an arc from zero degrees to ninety degrees.

8. An assembly as in claim 1 further comprising mounting means formed on said base and connected to said stanchions for removably securing said plurality of stanchions to said base.

9. An assembly as in claim 8 wherein said mounting means comprises a plurality of sockets fixedly secured to said base and each being dimensioned to removably receive one end of a different one of said stanchions therein.

10. An assembly as in claim 9 further comprising locking means mounted on each of said plurality of stanchions and disposed for removable securement of respective ones of said stanchions in one of said receiving sockets.

11. An assembly as in claim 1 wherein said liquid delivery means comprises a wick structure formed from a material which facilitates liquid flow therealong by capillary action and having one portion of said wick disposed in engagement with the liquid within an outer container and another portion of said wick disposed in fluid delivering relation to an interior of a planting pot.

* * * * *